United States Patent Office 3,079,758
Patented Mar. 5, 1963

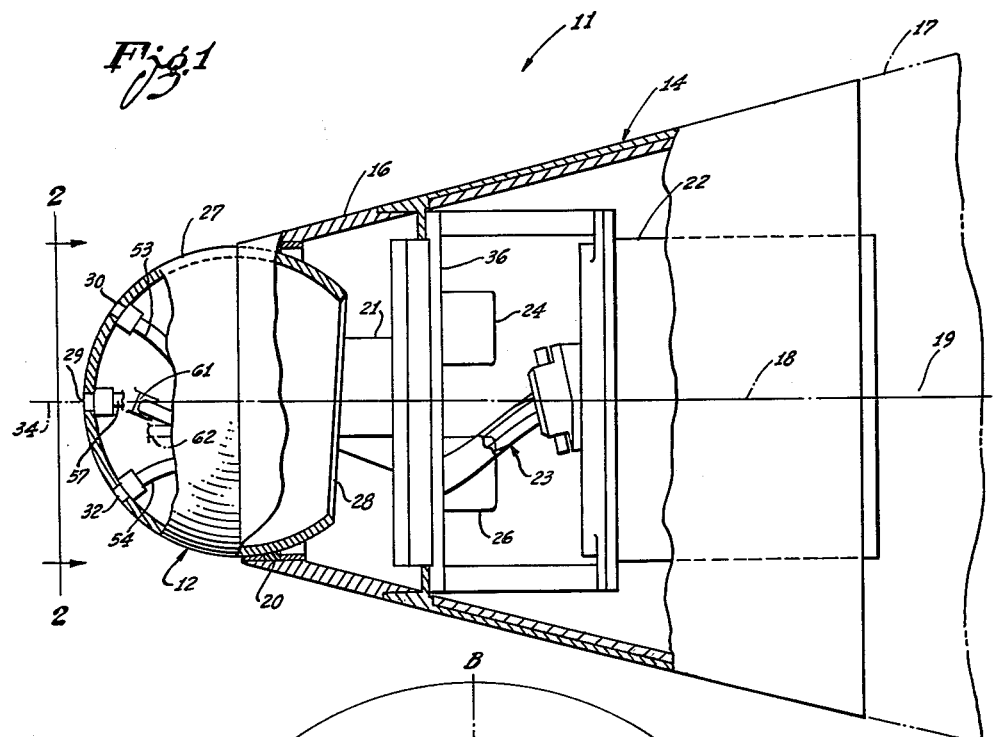
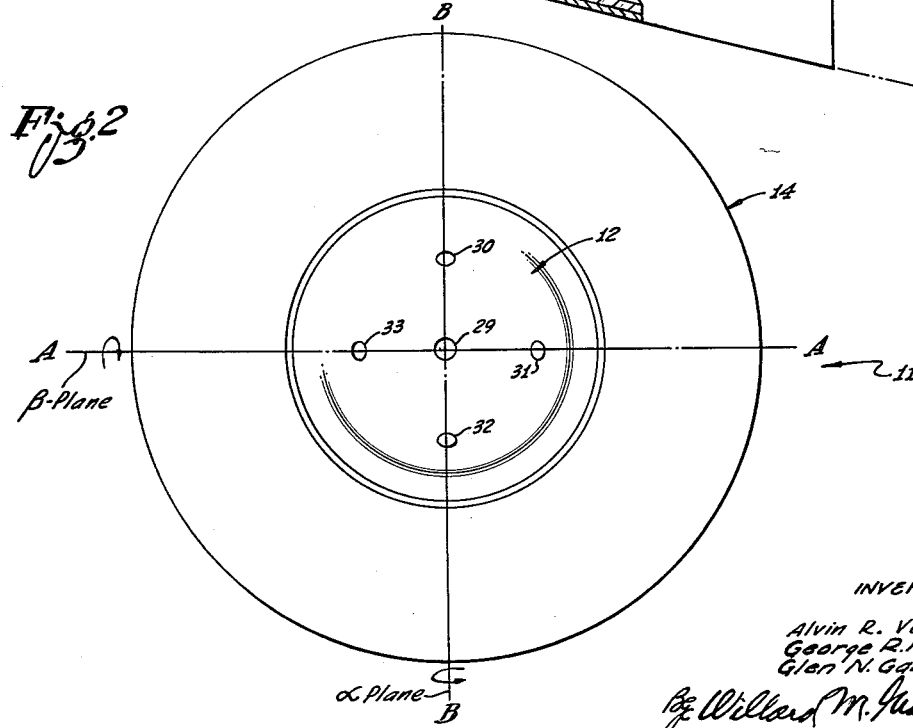

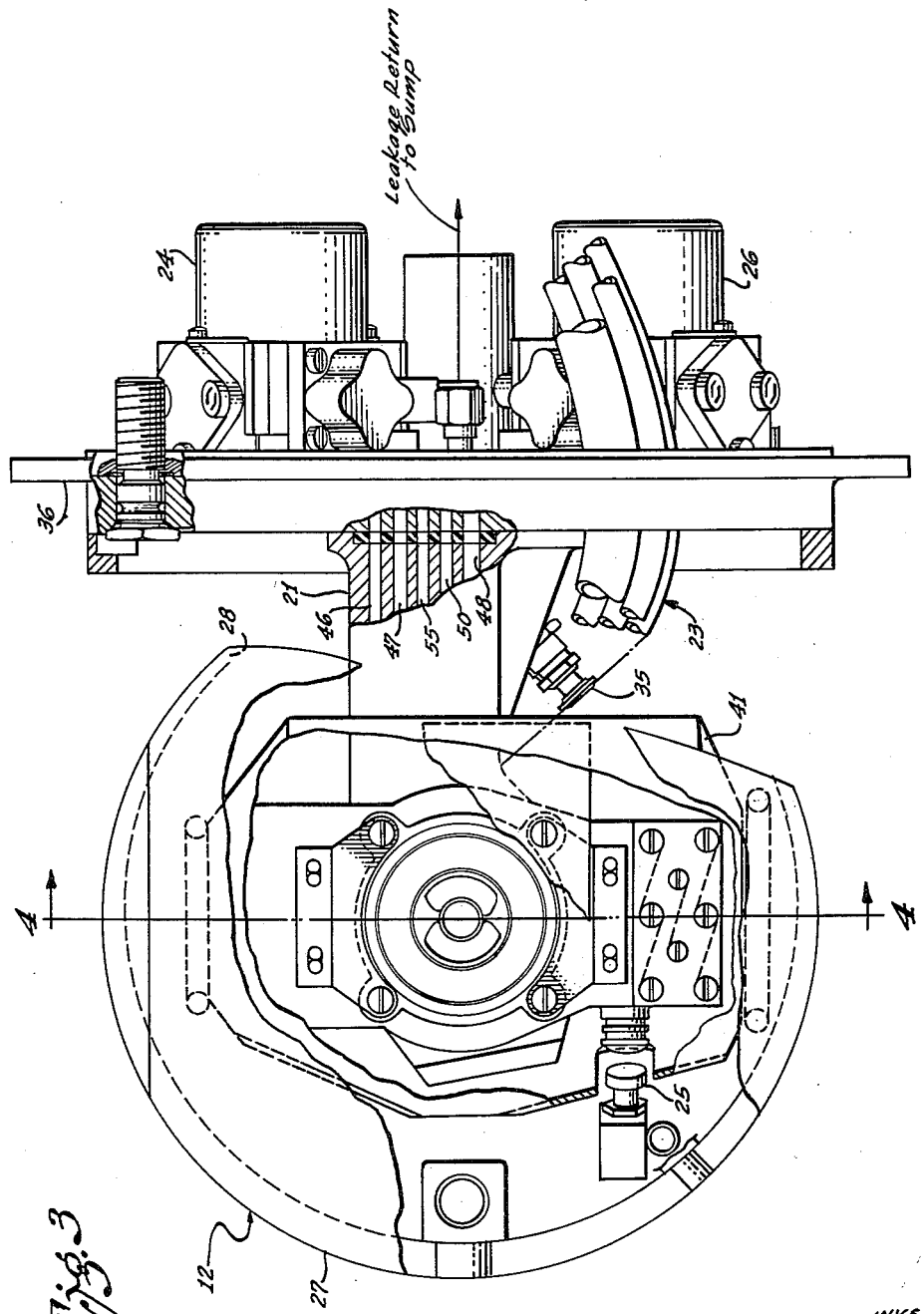

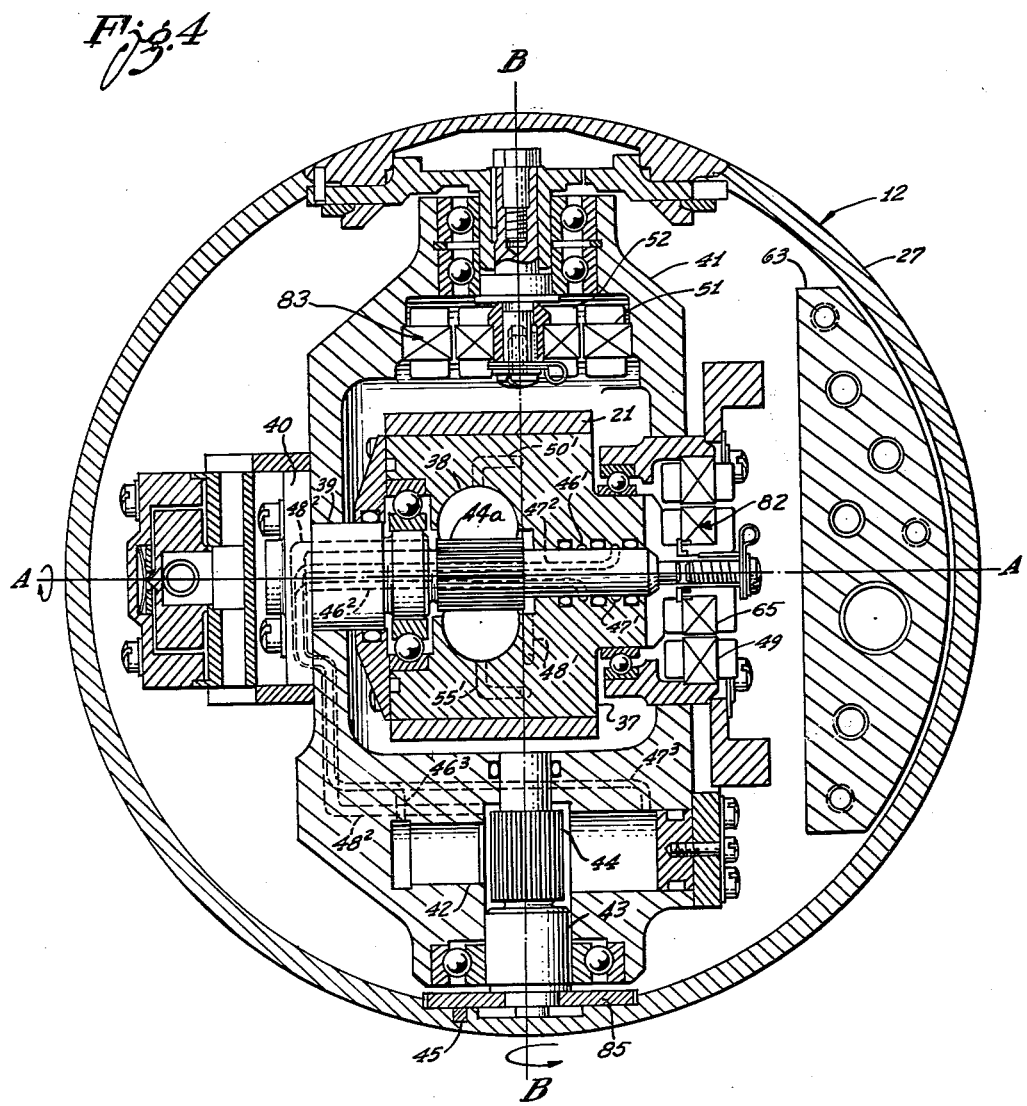

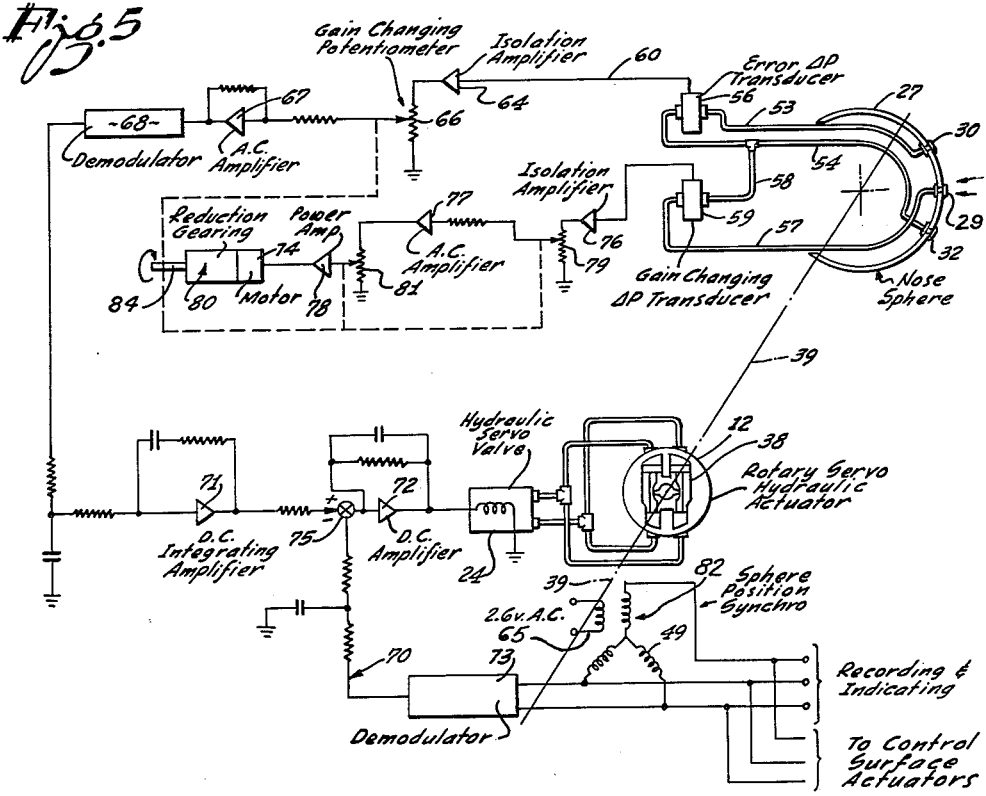

3,079,758
FLOW DIRECTION SENSOR
Alvin R. Vogel, Los Angeles, Glen N. Garrett, Hermosa Beach, and George R. Mills, San Pedro, Calif., assignors to Northrop Corporation, Beverly Hills, Calif., a corporation of California
Filed Feb. 23, 1960, Ser. No. 10,372
6 Claims. (Cl. 60—97)

This invention pertains to sensing devices and more particularly to a self contained air flow direction sensor adapted to be mounted on an aircraft or like vehicle and functions to measure precisely and indicate electrically the angles of attack and slideslip of the vehicle on which the sensor is mounted.

A predetermined relation of high speed vehicles, for example aircraft, missiles, rockets, etc., with respect to relative wind must be maintained if heating, buffeting, etc. of the vehicle are to be minimized. The above statement is particularly true of a vehicle traveling at hypersonic speed during its reentry into the atmosphere. During the reentry period it is imperative that the attitude of a vehicle be such that its longitudinal axis has a predetermined relation with respect to relative wind if the aforementioned objectional features are to be minimized.

Accordingly, it is an object of this invention to provide a fluid flow sensor which, when mounted on an aircraft or like vehicle, provides means whereby the aircraft is most advantageously aligned with respect to relative wind.

Another object is to provide a fluid flow sensor which, when mounted on an aircraft or like vehicle, is adapted to precisely measure and indicate the angles of attack and slideslip of the aircraft.

Another object is to provide a fluid flow sensor which, when mounted on a piloted aircraft, provides the pilot of the aircraft with pertinent information enabling the pilot to effect a proper reentry from near space after a ballistic trajectory.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a side elevational view of the fluid flow sensor as disclosed herein, parts thereof being broken away to better illustrate its construction.

FIGURE 2 is a front view of the fluid flow sensor of FIGURE 1.

FIGURE 3 is a side elevational view on an enlarged scale of the sphere and support assembly portions of which are broken away to better illustrate the construction thereof.

FIGURE 4 is an enlarged sectional view of the sphere assembly taken as indicated by the line 4—4 in FIGURE 3.

FIGURE 5 is a wiring diagram illustrating the various electronic circuits for controlling the head of the fluid flow direction sensor of FIGURE 1.

Referring to the drawings, FIGURES 1 and 2 show a preferred embodiment of the fluid flow direction sensor as disclosed herein. In these figures the sensor, identified generally by the numeral 11, consists of a sphere assembly 12 and a cone assembly 14.

The cone assembly 14 includes a housing 16 of frustro-conical configuration, the large end of which is attached to and constitutes the forward portion of the fuselage of an aircraft 17, missile, rocket, or like vehicle. The sphere assembly 12 is mounted in the forward or small end of the housing 16 in a manner presently described. By referring to FIGURE 1 it will be seen that the axis 18 of the housing 16 and the longitudinal axis 19 of the aircraft 17 coincide; accordingly the sensor 11 constitutes the nose portion of the aircraft 17. The assembly 14 is further characterized in that a support member 21, an electronic package 22, pneumatic conduit assembly 23, electro-hydraulic valves 24 and 26, and other miscellaneous equipment are mounted in the housing 16.

The sphere assembly 12 includes a spherical shell 27 having an access opening 28 and a plurality of ports 29–33, inclusive, which extend through the wall of the shell 27. The assembly 12 is mounted for limited angular movement on the support member 21 at the forward end of the housing 16. In this respect the member 21 extends through the access opening 28 and is attached to the shell 27 in a manner presently described. The angular movement of the assembly 12 is restricted so that, as the shell is moved through a predetermined angular range, the opening 28 is limited in its movements to positions within the housing 16 and is of a size allowing unrestricted movement of the shell 27 with respect to the support member 21. The angular movement of the sphere assembly is effected by pivotal movement about one or both of two axes having a right angle relation with respect to each other, the respective pivotal movements being limited by two pairs of stop means 25 and 35 (only one of each pair being shown in FIGURE 3). A cone lip ring and seal 20, located at the extreme forward end of the housing 16, prevents the flow of stagnation air through the cone-sphere joint and together with the support member 21 provides the only structural tie between the fixed cone assembly 14 and movable sphere assembly 12.

In the embodiment shown, the aforementioned ports 29–33 which extend radially through the wall portion of the shell 27, are circular in cross-section and are identified as a total fluid impact pressure sensing port 29, a first pair of fluid impact pressure sensing ports 30 and 32, and a second pair of fluid impact pressure sensing ports 31 and 33. The axis of the shell 27 which coincides with the axis of the port 29 is hereinafter referred to as the reference axis 34 of the sphere assembly 12. The ports 30–33 have a symmetrical arrangement about the axis 34 and are further characterized in that the ports 30 and 32 on the one hand and 31 and 33 on the other are respectively positioned in planes having a perpendicular relation with respect to each other. The respective included angles, that is the forward or acute angles included between the reference axis 34 and the axes of the ports 30 and 32 on the one hand and the angles between the reference axis and the axes of the ports 31 and 33 on the other, are not restricted to any particular angle. However, the included angles between the axis 34 and the axes of ports 30 and 32 must be equal; likewise the included angles between the axis 34 and the axes of the ports 31 and 33 must also be equal. It will also be noted that the access opening 28 is located approximately diametrically opposite with respect to the port 29.

The aforementioned planes having a perpendicular relation with respect to each other are hereinafter referred to as $\alpha$ and $\beta$ planes and are so designated in FIGURE 2. Throughout the specification pressure sensing ports located in the $\alpha$ plane, viz., the ports 30 and 32, also all components responsive to fluid impact pressures sensed by the ports 30 and 32 and the servo system controlling movement of the shell 27 in the $\alpha$ plane, will be referred to as $\alpha$ ports, components and systems. Likewise the pressure sensing ports 31 and 33 located in the $\beta$ plane, components responsive to fluid pressures sensed by the ports 31 and 33 and the servo system functioning to orient the shell 27 in the $\beta$ plane, are referred to as $\beta$ ports, components, systems, etc.

With the assemblies 12 and 14 assembled, as described above, the assembly 12 may be moved between a nulled and a plurality of nonnulled positions. The nulled position of the sphere assembly 12 is defined as that position in which the axis of the port 29 and the reference axis 34 is aligned with and opposes the relative wind. All other positions of the sphere assembly constitute nonnulled positions.

Referring to FIGURES 3 and 4 it will be seen that the support member 21 is attached to a bulkhead 36, the latter extending across the housing 16 perpendicular to the axis of the cone assembly 14. The inner end of the member 21 is secured to the bulkhead 36, extending in a direction generally normal to the bulkhead 36, and has its outer or forward end located inside the shell 27. The forward end of the member 21 carries means supporting the shell 27 and allows two-degree-of-angular-freedom motion to be imparted to the latter.

Fixedly secured to the outer end of the member 21 is a block or actuator housing 37 in which an $\alpha$ actuator 38 is mounted. The actuator 38 drives a lateral shaft 39 which is rotatably mounted in housing 37. An end flange 40 of shaft 39 is secured to a yoke-like member 41 surrounding the housing 37, so that member 41 is pivoted about axis A—A (coincident with the center-line of shaft 39) by action of actuator 38. Shell 27 is rotatably mounted at the top and bottom of yoke-like member 41 to pivot about a normally vertical axis B—B perpendicular to axis A—A.

Mounted in an arm portion of the yoke-like member 41 is a $\beta$ actuator 42 adapted to impart angular movement to a shaft 43. The shaft 43 in turn imparts angular movement to the shell 27, about the B—B axis (FIGURE 4), by means of a disk 85 attached solidly to the shaft 43 and an eccentric projection 45 provided on the outer portion of the disk 85 and fitting into a recess in shell 27.

Thus, the outer shell 27 can be angularly pivoted about axis B—B by actuator 42, and at the same time can be pivoted about axis A—A by actuator 38.

The actuators 38 and 42 constitute hydraulic actuators and are quite similar in design and construction to the actuator disclosed and claimed in copending application Serial No. 782,512, filed December 23, 1958, now Patent No. 2,946,320, issued July 26, 1960. Piston rods (not shown) extending between the pistons (not shown) of the actuators 38 and 42, mesh with pinions 44a and 44, respectively, and function to impart true rotary or pivotal movement to the shafts 39 and 43 and preclude the possibility of backlash occurring between the connecting rods and pinions for reasons set forth in the aforementioned copending application.

The electro-hydraulic valves 24 and 26 control the flow of hydraulic fluid to the actuators 38 and 42, respectively; accordingly the valve 24 is hereinafter referred to as the $\alpha$ valve and the valve 26 as the $\beta$ valve. Fluid communication between the valves 24 and 26 and the actuators 38 and 42 is provided by internal passages provided in the bulkhead 36, support member 21, actuator housing 37, shaft 39 and yoke-like member 41. For example, pressurized hydraulic fluid under the control of the $\beta$ valve 26 is routed through the passageways 46 and 47 to the $\beta$ actuator 42. Pressurized fluid in the passageways 46 and 47 may be equal or unequal as a result of fluid impact pressures sensed by the ports 31 and 33. In other words, fluid pressures in the passages 46 and 47 will be equal on one hand and unequal on the other at such times as the sphere assembly 12 is in its nulled or nonnulled position, respectively. Fluid at the same pressures, controlled by the $\alpha$ valve 24, is routed through the passageways 50 and 55 to the actuator 38. Fluid which may leak past the pistons of the actuators 38 and 42 is returned through the passage 48.

The passages 50 and 55 communicate with passages 50' and 55' formed in the actuator housing 37, the latter passages leading directly to and providing a path for fluid flow to the actuator 38 substantially as shown in FIGURE 4.

The passages 46 and 47 terminate in annular grooves 46' and 47' formed in the bore receiving the shaft 39. Passages $46^2$ and $47^2$ formed in the shaft 39 and passages $46^3$ and $47^3$ formed in the yoke-like member 41, provide fluid communication between the grooves 46' and 47' and the $\beta$ actuator 42 as best seen in FIGURE 4. Fluid, which may leak past the pistons mounted in the actuator 42, is returned to the sump of the $\alpha$ actuator 38 through a passage $48^2$ formed in the yoke-like member 41 and shaft 39. From the sump of the actuator 38 leakage fluid is returned to a receiver (not shown) via a passage 48' and the passage 48 provided in the support member 21.

By referring to the aforementioned copending application it will be seen that the cylinders of the actuators 38 and 42 are cross-ported. In other words, pressurized fluid flowing through the passage 50 communicates simultaneously with a pair of chambers of the $\alpha$ actuator 38 having different cross-sectional areas; the same is true of pressurized fluid flowing through the passage 55. In like manner, pressurized fluid flowing through the passage 47 communicates simultaneously with a pair of chambers of the $\beta$ actuator 42 having different cross-sectional areas; this is also true of pressurized fluid flowing through the passage 46. This unique feature of cross-porting the cylinders of the actuators 38 and 42 provides a preload between the pinions 44a and 44 and the connecting rods comprising components of the actuators 38 and 42. Thus backlash, which normally would occur between the aforementioned connecting rods and the pinions 44a and 44, and which cannot be tolerated in a device of this type, is effectively eliminated in the manner described in the aforementioned copending application.

Construction of the sphere assembly 12 is completed by $\alpha$ and $\beta$ synchros 82 and 83, respectively. The portion 65 constitutes the stator of the $\alpha$ synchro 82 while the rotor 49 moves with and reflects angular movement of the yoke 41 and shell 27 about the axis A—A. The portion 51 constitutes the stator of the $\beta$ synchro 83 while the rotor 52 moves with and reflects angular movement of the shell 27 about the axis B—B. The function of the synchros 82 and 83 will become apparent as the disclosure progresses.

The $\alpha$ and $\beta$ servo systems are of identical construction, the $\alpha$ system functioning to orient the shell 27 in $\alpha$ planes while the $\beta$ system functions to orient the shell in $\beta$ planes. The $\alpha$ system is responsive to differences in fluid impact pressure sensed by the ports 30 and 32 and the $\beta$ system is responsive to differences in fluid impact pressure sensed by the ports 31 and 33. Accordingly, only the $\alpha$ system will be described herein; however, this description will also be equally applicable to the $\beta$ system. The major electrical and electronic components comprising the $\alpha$ and $\beta$ servo systems are mounted in the electronic package 22 (FIGURE 1).

The $\alpha$ servo system is schematically shown in FIGURE 5; referring to this figure it will be seen that flexible conduits 53 and 54 extend from and transmit differential fluid pressure from the ports 30 and 32 to the opposite sides of a capacitance type pressure transducer 56 hereinafter referred to as an error transducer. A flexible conduit 57 and also a branch line 58, the latter communicating with fluid pressure in the conduit 54, extend from and transmit differential fluid pressure from the ports 29 and 32 to the opposite sides of a capacitance type pressure transducer 59, hereinafter referred to as a gain-changing transducer. In this respect it will be understood that flexible conduits, identified by the numerals 61 and 62 (FIGURE 1) extend between the $\beta$ ports 31 and 33 and a pair of transducers (not shown) which function similarly as the transducers 56 and 59 with respect to the $\beta$ plane. The conduits 53, 54, 57, 61 and 62 exit from the sphere 27 through the access opening 28. Inasmuch as they are flexible and are secured together as shown in FIGURE 3, they do not restrict the angular movement of the shell 27. Prior to their exit through the access opening 28, in order that they may be held clear of moving components mounted in the shell 27, the conduits are routed through a plate 63 (FIGURE 4) which is secured to the wall of the shell 27.

The error transducer 56 functions to convert the differential pressures sensed by the α ports 30 and 32 to corresponding A.C. voltages of a magnitude and phase proportional to the magnitude and direction of the fluid impact pressure acting on the shell 27 caused by the moving air. The transducer 56 is connected in a conventional electrical bridge circuit (not shown) which is excited by a 400 c.p.s. reference voltage. The corresponding bridge error voltage, hereinafter referred to as the α command signal, is then a function of the aforementioned differential pressure. The phase of the voltage indicates the sign of the error position of the shell 27 with respect to the direction of relative wind.

The aforementioned α command signals are transmitted through a conductor 60 to an isolation amplifier 64, the latter functioning to couple the high output impedance of the error transducer 56 to the low impedance input of a sensor loop gain compensator to be described presently. The A.C. α command signals are then passed through a gain changing potentiometer 66 and subsequently are fed to a second amplifier 67 functioning to raise the voltage level to a value high enough to minimize the effects of drift which the error signals subsequently experience as the error signals pass through a demodulator 68 and a D.C. amplifier 71. The demodulator 68 converts the A.C. α command signals to D.C. α command signals. The D.C. α command signals are integrated and elevated in the D.C. amplifiers 71 and 72, respectively, and subsequently are fed to the α hydroelectric servo valve 24.

The hydraulic servo valve 24 is of a type disclosed in U.S. Patent No. 2,767,689. The valve 24 controls the flow of pressurized fluid to the α actuator 38. Movements of the actuator 38 are transmitted to the shell 27 through the shaft 39 represented schematically in FIGURE 5 by the dot and dash line identified by the numeral 39. Thus the shell 27 is rotated in the α plane directly into or more nearly into the direction of relative wind.

The portion 65 of the α synchro 82 is shown schematically in FIGURE 5 as being mounted on and rotating with the shaft 39. This is not the case in actual practice as it will be seen by referring to FIGURE 4 that the rotor 49 is actually rotated by the yoke 41; however, the results are the same. Accordingly, the instantaneous position of the shell 27 is indicated by the output of the α synchro 82. The synchro 82 is connected to feed electrical signals to a conventional summing circuit 70. The corresponding voltage summation provided by the summation circuit 70, hereinafter referred to as the α error signal, reflects the angular position of the shell 27 with respect to its null position when considered in the α plane. The A.C. synchro output voltage is demodulated by the demodulator 73, compared with the command signals received from the amplifier 71 at the summation point 75, and any difference is again amplified by the amplifier 72 and passed to the servo valve 24. This latter signal results in movements of the shell 27 in the α plane until the latter reaches its null position, that is until the reference axis 34 is headed directly into relative wind. Simultaneously as the shell 27 reaches its null position the error and command signals cancel each other and accordingly there is no further movement of the shell 27 until such time as there is a change in position of the shell 27 with respect to relative wind.

The α error signals provided by the synchro 82 are also transmitted to indicating apparatus (not shown) which may be mounted on the instrument panel of the aircraft 17. Accordingly by observing the indicating apparatus the pilot of the aircraft is able to change its course so that it will be headed directly into, or will assume, a predetermined relation with respect to relative wind. Alternately duplicate error signals provided by the synchro 82 may be transmitted directly to control surface actuators or reaction jets, in the case of a pilotless aircraft, to correct its attitude.

The gradient of the shell 27 pressure distribution (pressure measured by the transducer 56 per degree of shell positional error) is directly proportional to dynamic pressure, and gain compensation is therefore necessary if gain is to be maintained constant at various speeds of the aircraft 17. This gain compensation is accomplished by varying the electrical gain as a function of the reciprocal of the above referred to dynamic pressure.

The above mentioned gain compensation is accomplished by a gain changing servo. Inasmuch as the gain changing transducer 59 is pneumatically coupled to the port 29 and the port 32, it will be apparent that the diaphragm of the transducer 59 will be subject to differential fluid pressure at all times regardless of the angular position of the shell 27. This differential pressure is precisely the quantity that varies with dynamic pressure and causes a gain change in the outer loop, that is the loop or circuit providing the command signals. Outer loop gain is achieved by multiplying the α command signals by $1/q$. This multiplication is effected by an instrument servo 80, the output shaft 84 of which is rotated by a servo motor 74 and mechanically ganged to potentiometers 66, 79 and 81. Mechanically the multiplication is performed by feeding signals originating with the transducer 59 to the instrument servo 80, passing through an isolation amplifier 76, A.C. amplifiers 77 and 78, and potentiometers 79 and 81, in route. Accordingly it will be seen that wipers of the potentiometers 66, 79 and 81 will be moved, to either increase or decrease error signals in the outer loop and, therefore, the level of these latter signals will be maintained substantially constant.

To more fully understand the function of the sensor 11, reference is made to the following description of its operation.

*Operation*

In describing the operation of the present device it is assumed that the sensor 11 is mounted on a conventional aircraft 17. So mounted, and at such times as the aircraft is in level flight, the α ports 30 and 32 are located in a vertical plane and the β ports 31 and 33 in a horizontal plane. Under these conditions it will be apparent that upon changes in the angle of attack of the aircraft the α ports 30 and 32 will sense different fluid pressures and the same will be true of the β ports 31 and 33 upon changes in the angle of slideslip of the aircraft. In the event the α ports on one hand or the β ports 31 and 33 on the other, or both, sense differences in fluid pressure, due to a change in the attitude of the aforementioned aircraft, the α and β servo systems are activated and function to orient the shell 27 so that the ports 31 and 33 will again sense equal or predetermined fluid pressures and the sphere assembly will be returned to its nulled position. In other words, the shell 27 will be angularly moved so that the reference axis 34 again points directly into relative wind.

The error signals, originating with either the synchro 82, 83, or both, may be transmitted directly to indicating apparatus (not shown) which are mounted on the instrument panel of the aforementioned aircraft. The pilot of the aircraft may then utilize these signals to correct the attitude of the aircraft when no other usual means or reference is available, and where time is critical. Alternately the error signals may be transmitted to actuators associated with the control surfaces or thrust jets of the aircraft, as schematically shown in FIGURE 5, to automatically correct its attitude.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Apparatus adapted to sense fluid impact pressures and functioning to assume a predetermined relation with respect to a fluid stream when positioned therein comprising: a spherical shell having a reference axis constituting an axis of said spherical shell; wall portions of said shell defining an opening providing access to the interior of said shell; support means mounting said shell in a fluid stream for movement therein about a pair of axes of said shell; the position of said shell on said support means being characterized in that said reference axis has a generally parallel relation with respect to the direction of flow of said fluid stream; said support means including actuator means, the latter means including a pair of zero-backlash actuators mounted within said shell along said respective shell axes and being responsive to command signals to pivot said shell to a position in which said reference axis has a true parallel relation with respect to the direction of flow of said fluid stream; a plurality of ports provided in a forward portion of said shell positioned at positions in which they are subjected to direct fluid impact pressures of said fluid stream; transducer means responsive to said fluid impact pressures to which said ports are subjected and functioning to convert said fluid impact pressures into said command signals; conduit means transmitting said fluid impact pressures from said ports to said transducer means; and means for transmitting said command signals to said actuator means.

2. Apparatus as set forth in claim 1: further characterized in that said actuators constitute hydraulic means, and including fixed internal hydraulic passages in said support means, a shaft of one said actuator being rotatable with respect to a fixed portion of said support means, hydraulic passages in said shaft, and annular means around said shaft providing respective rotary fluid connections between said fixed passages and said shaft passages, whereby all hydraulic operating lines and ports within said shell can be completely provided without tubing means.

3. Apparatus adapted to sense fluid impact pressures and functioning to assume a predetermined relation with respect to a fluid stream when positioned therein comprising: a spherical shell having a reference axis constituting an axis of said sphere; wall portions of said shell defining an opening providing access to the interior of said shell; elongated support means including gimbal-like means mounting said shell in a fluid stream for pivotal movement therein about a pair of axes having a normal relation with respect to each other and with respect to said reference axis; the attitude of said shell on said support means being characterized in that said reference axis extends generally in the direction of flow of said fluid stream and said access opening being positioned downstream in said fluid stream; a plurality of ports provided in a forward portion of said shell positioned so that said ports are subjected to direct fluid impact pressures of said fluid stream; actuator means including a pair of actuators adapted to impart movement to said shell; said actuators and gimbal-like means being attached to one end of said support means and being mounted entirely within said shell; said actuator means being responsive to command signals corresponding to said fluid impact pressures and functioning to pivot said shell to a position in which said reference axis has a true parallel relation with respect to the direction of flow of said fluid stream; transducer means responsive to said fluid impact pressures functioning to convert said fluid impact pressures into said command signals; conduit means transmitting said fluid impact pressures from said ports to said transducer means; and means for modifying and transferring said command signals to said actuator means in inverse proportion to total dynamic pressure.

4. Apparatus as set forth in claim 3: further characterized in that said actuators constitute hydraulic means, and wherein portions of said support and actuator means have internal passageways and rotary fluid connections for conducting hydraulic fluid to and from said actuator means.

5. Apparatus as set forth in claim 3: further characterized in that said plurality of ports constitute two pairs of error ports and a total pressure port; said transducer means constituting a pair of error transducers and a gain changing transducer; said total pressure port being circular in cross-section and the axis thereof being coaxial with said reference axis; and said conduit means constituting a first set of conduits providing fluid communication between one pair of said error ports and one of said error transducers, a second set of conduits providing fluid communication between the other pair of said error ports and the other one of said error transducers, and a third set of conduits providing fluid communication from said total pressure port and one of said error ports to said gain changing transducer.

6. Apparatus as set forth in claim 5: further characterized in that said modifying and transferring means include a pair of inner and a pair of outer servo loops, said outer loops receiving and being responsive to signals received from said error transducers and said inner loops receiving and being responsive to signals received from said gain changing transducer, whereby the level of signals from said outer loops is maintained constant regardless of the magnitude of signals received from said error transducers.

References Cited in the file of this patent
UNITED STATES PATENTS

| 2,343,288 | Fink | Mar. 7, 1944 |
| 2,515,251 | Morris | July 18, 1950 |
| 2,736,198 | Kuhn | Feb. 28, 1956 |